J. M. Lanier,
Harness,
N° 26,272.    Patented Nov. 29, 1859.
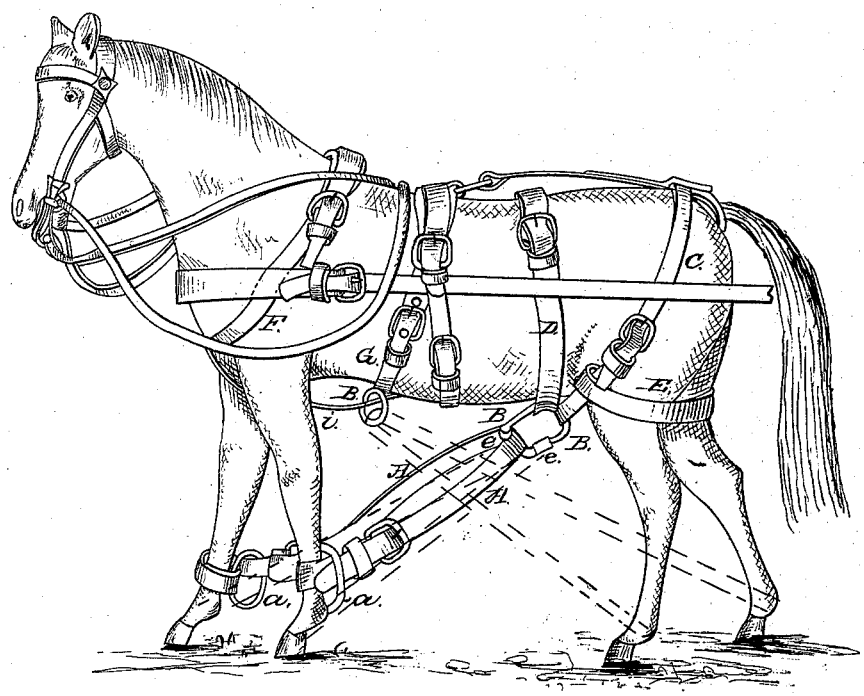
Witnesses:
T. H. Alexander
C. W. Franzoni
Inventor:
John. M. Lanier

UNITED STATES PATENT OFFICE.

JOHN M. LANIER, OF EUFAULA, ALABAMA.

APPARATUS FOR TAMING HORSES.

Specification of Letters Patent No. 26,272, dated November 29, 1859.

*To all whom it may concern:*

Be it known that I, JOHN M. LANIER, of Eufaula, in the county of Barber and the State of Alabama, have invented certain new and useful Improvements in Apparatus for Taming Horses; and I do hereby declare the following to be a full, clear, and exact description of the same, reference being had to the annexed drawings and the letters of reference marked thereon.

The nature of my invention consists in effectually preventing horses from rearing, kicking or running, by the employment and combination of certain devices, the peculiarities of which, will be herein after fully set forth.

To enable others skilled in the art to make and use my invention, I will now describe its construction and operation.

In the drawings—(C,) represents a strap which extends down diagonally from the commencement of the horse's tail to the front of his hind legs or flanks. Said strap is provided with a buckle on each side in order that it may be either lengthened or shortened as the size of the animal may require.

(B, B,) is a metal loop through which the lower portion of the strap (C,) passes. Said loop (B,) is rounded at its upper end and square at its lower, and is provided with two small rollers (e, e,) one upon its lower side, and the other at its lower end, as may be fully seen in the drawings.

(D) represents a band which passes through loop (B,) and up over the horse's back and immediately in front of his flanks.

(E,) is a band or strap which extends around the fleshy part of the horse's hind legs, and connects on each side with the strap (C,) as fully shown in the drawings.

(A) represents the check strap which should be just of sufficient length to allow the horse free use of his legs when either walking or trotting. Said strap passes througs the lower portion of loop (B,) and over the rollers (e, e,) and is provided at both ends with metal rings (a, a), also with buckles—so that the length may be regulated as necessity requires, by means of these rings (a, a,) loops may be made at both ends of strap (A,) and placed around the fetlocks of the front legs. By attaching the loop (R,) similar to (B,) on the under side of the bellyband (G,) the strap (A,) may be reversed and secured to the hind legs, thus effecting virtually the same end—and if necessary they may be used on the hind and front legs at the same time.

The operation of my apparatus is as follows: Each part being properly adjusted as herein set forth and as also shown in the drawings, the animal is attached to the vehicle or led as the case may be; as he places one foot forward his body also advances, thus the strap (A,) alternately accommodates itself to the right and left foot, by slipping loosely in loop (B.) It will be observed that the animal is necessarily confined to two gaits—viz: walking and trotting; should he attempt to rear, kick or run off he will be immediately thrown upon his knees, thus effectually curing him of all viciousness, and at the same time preventing any injury to the person who may be breaking him.

My invention will be found to possess very great utility in many points of view: 1st as an apparatus for taming both young and vicious horses, it at once usurps the place of harsh and cruel treatment, and renders in a few hours, even the most vicious animal as docile as a lamb; 2nd, as a cure and preventive to kicking, rearing and running off it affords a simple and effectual remedy; 3rd, to prevent horses from jumping fences when turned loose it is the most safe and sure remedy known; 4th, to drovers it is invaluable. It is also equally adapted to horses under the saddle.

Having thus fully described my invention what I claim and desire to secure by Letters Patent is—

The employment of the straps A, A, loop B, and straps D, C, and E, when the same are constructed, arranged, and used, substantially as and for the purpose herein specified.

JOHN M. LANIER.

Witnesses:
T. H. ALEXANDER,
C. W. FRANZONI.